May 29, 1962   W. D. SHOBERG   3,036,511
VENTILATORS

Filed April 20, 1959   3 Sheets-Sheet 1

INVENTOR
Wayne D. Shoberg
Eugene E. Stevens
Eugene E. Stevens III
BY
ATTORNEYS

May 29, 1962

W. D. SHOBERG 3,036,511

VENTILATORS

Filed April 20, 1959

INVENTOR
Wayne D. Shoberg

Eugene E. Stevens
Eugene E. Stevens III
BY
ATTORNEYS

May 29, 1962 W. D. SHOBERG 3,036,511
VENTILATORS

Filed April 20, 1959 3 Sheets-Sheet 3

INVENTOR
Wayne D. Shoberg

BY Eugene E. Stevens
Eugene E. Stevens III
ATTORNEYS

United States Patent Office 3,036,511
Patented May 29, 1962

3,036,511
VENTILATORS
Wayne D. Shoberg, P.O. Box 343, Fort Bragg, Calif.
Filed Apr. 20, 1959, Ser. No. 807,424
14 Claims. (Cl. 98—71)

My invention relates to ventilators of the rotatable air current-controlled bonnet-incorporating type, and while particularly suitable for house trailers may be used for other purposes.

Briefly and generally stated, the invention has for its primary object to generally improve upon the ventilator structure of my Patent No. 2,755,727, dated July 24, 1956.

A further and more specific object is to provide an improved mount for rotatably supporting the air current-controlled bonnet, and which mount also supports a sealing member with which the under surface of the bonnet is engaged when the ventilator is not in use.

Additionally, it is an aim of the invention to associate with the rotatable bonnet-supporting mount, novel means for controlling movement of the bonnet to and from its operative ventilating position, and for admitting of free wind control of bonnet movement about the mount-supported axis.

In its more limited aspect, an important object of the invention is to provide simultaneously actuatable and oppositely directed lever means which are carried by a rotatable bonnet support and are operable to actuate the bonnet to and from operative ventilating position, the said lever means being preferably operated by a control member which is carried by a fixed bearing-providing mount for said rotatable bonnet support.

Invention also resides in certain novel features of construction, combination and arrangement of the various parts, and in modes of operation thereof, as will be readily understood and appreciated by those versed in the art upon reference to the accompanying drawings in conjunction with the detailed description thereof appearing hereinafter.

In accordance with patent statute requirements certain now preferred examples of the invention have been chosen for purposes of illustration. However, it is to be understood that the present drawing disclosures are to be taken as illustrative rather than limitative, since my inventive concept is susceptible of other mechanical expressions within the spirit and scope of the subject matter claimed hereinafter.

In the drawings, wherein the same reference characters have been used to designate the same parts wherever they appear throughout the several views—

Figure 1:
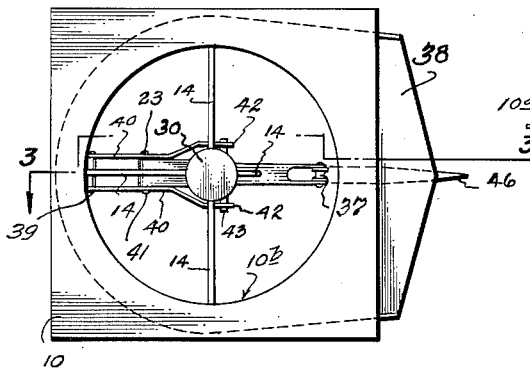
FIG. 1 is a bottom plan view of one form of my ventilator.
Figure 2:
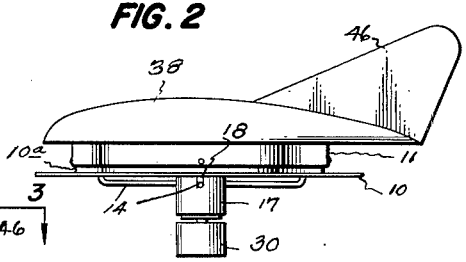
FIG. 2 is a side elevation of the device of FIG. 1, with its bonnet in the lowered inoperative position.
Figure 3:
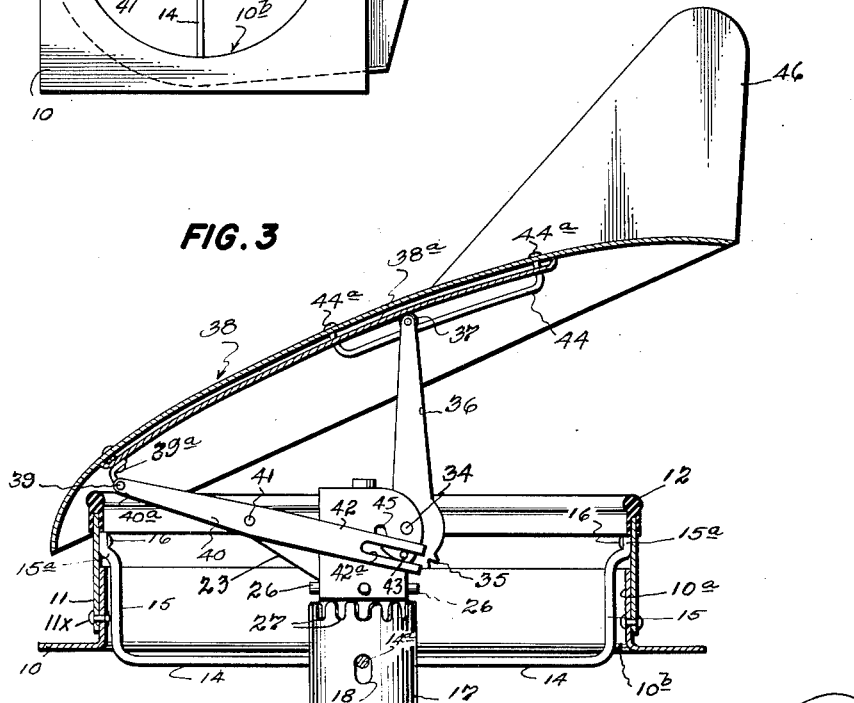
FIG. 3 is a sectional view taken on the line 3—3 of FIG. 1 but showing the bonnet in its free rotational elevated an upwardly canted operative position.
Figure 4:
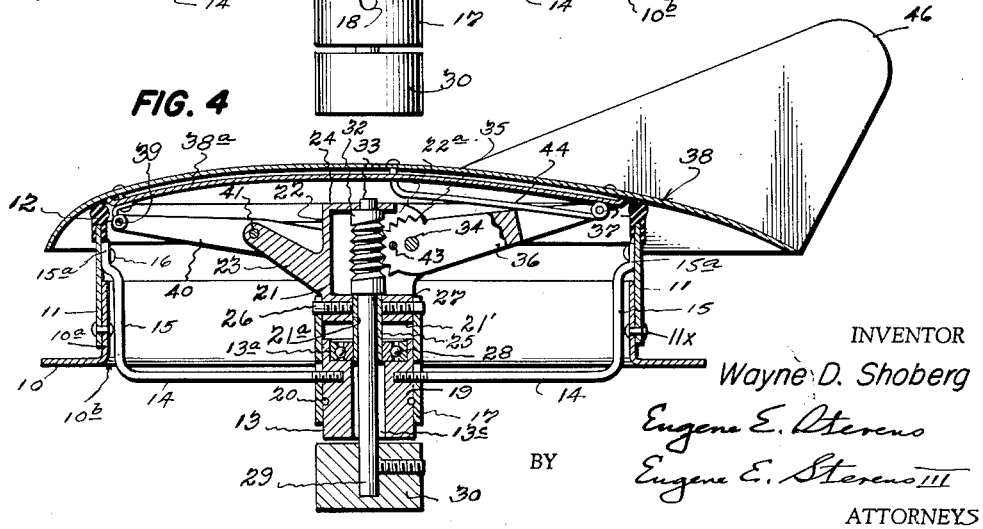
FIG. 4 is a view similar to FIG. 3, but with the bonnet lowered and locked against rotation under wind current action.
Figure 5:
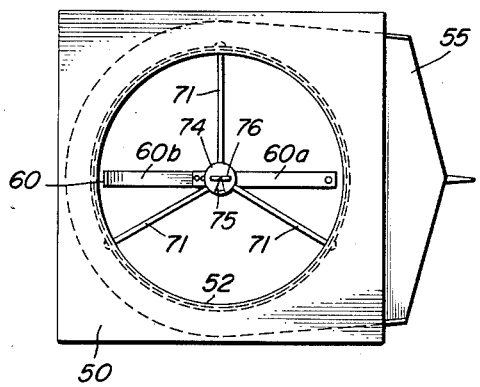
FIG. 5 is a bottom plan view of a modified form of the invention.

Referring to the drawings by reference characters and turning to FIGS. 1–4, inclusive, numeral 10 designates a base plate having a central hole 10b which is bordered by an upstanding circular flange 10a. This flange 10a is surrounded by the functionally integral upstanding annular flange 11 as illustrated in FIGS. 3 and 4. The upper end of the flange 11 has a buffer-like beading 12 for supporting a bonnet form closure 38 in its lowered position, as will be presently explained.

Any desired means 11x may be employed for securing flanges 10a, 11 together and the advantage of making said flanges as initially separate units will be pointed out hereinafter.

Arranged concentrically of and within the annular flanges 11a, 10, is a preferably cylindrical block 13 which is supported by the inner threaded ends 14a of L-form arms 14 having the upwardly extending portions 15 which terminate in offset ends 15a. These offset arm ends 15a are riveted or otherwise secured as at 16 to the flange 11 above the top of the flange 10a, as shown in FIGS. 3 and 4.

Surrounding the major portion of the block 13 and projecting above the upper end thereof, as shown in FIG. 4, is the vertically shiftable sleeve 17. This sleeve 17 provides the elongated vertical holes 18 through which the block supporting arms 14 extend, as indicated in FIG. 4, so as to limit vertical movement of said sleeve. The function of sleeve 17 will be explained later on.

FIG. 4 illustrates the block member 13 as having an exterior circumferentially extending groove 19 in which is located a split ring or the like 20 for frictionally retaining the sleeve 17 in its lowered or elevated positions, as shown in FIGS. 3 and 4, respectively.

Seated in the upper end of the sleeve 17 is the disk form base 21' of a gear box 21 having the upstanding portion 22 which provides the laterally spaced sides 22a below the horizontally extending top portion 24. The gear box 21 also has the arm 23 which extends diagonally outward and upward from a point above the base portion 21' and which arm 23 terminates above the plane of the top of the sleeve 17, as shown in FIG. 4.

FIG. 4 also shows that the base portion 21' of the gear box 21 has the concentric vertical bearing hole 21a which receives the upper portion of the depending sleeve 25. Sleeve 25 is secured in place by the inner ends of a plurality of threaded studs 26 which are carried by the gear box base portion 21, as indicated. These studs 26 have outwardly extending ends which project beyond the outer periphery of the gear box base 21' to be received in appropriate ones of a circumferential series of end notches 27 which are formed in the upper end of the sleeve 17 as clearly indicated in FIGS. 3 and 4.

The sleeve 17 is shiftable vertically to engage and disengage stud ends 26 with the notches 27, as will be apparent from FIG. 3, and for a purpose which will be presently understood.

The upper end of the cylindrical block member 13 has the circular bearing-receiving seat or recess 13a which surrounds the central block member-provided bore 13c. This seat 13a receives the ball bearing assembly 28 comprising the inner and outer rings and the intermediate ball race. The outer bearing ring is fixed to the surrounding wall of recess 13a, while inner ring is preferably made fast to sleeve 25.

Projecting through the bore 13c and through the sleeve 25 is the rotatable shaft 29 which is formed adjacent its upper end with the worm gear 32, the lower end of which rests on the upper end of the sleeve 25. Secured to the lower end of the shaft 29 below the lower end of block 13 is an operating finger piece 30, a set screw 31 being employed to hold the finger piece 30 on the shaft 29.

The upper end of the worm gear 32 terminates in a bearing reduction 33 which is received in the bearing hole 24a in the upper portion of the gear case 21, as indicated in FIG. 4.

Pivoted as at 34 between the sides 22a of the gear box 21 is the worm-operated gear 35 which is formed at the inner end of an arm 36. This arm 36 is preferably of inverted U-form in cross-section and its outer end provides the laterally projecting roller bearing 37 which, as indicated in FIGS. 3 and 4, is adapted to bear against a reinforcing disc 38a which is secured to the lower surface of the bonnet 38. An elongated U-shaped keeper 44, carried by 38, 38a maintains roller 37 in close adjacency to the bonnet-reinforcing disc 38a.

In carrying out the invention, the bonnet 38, which is preferably of inverted dish form, has its reinforcing disc portion 38a pivoted as indicated at 39 to the free outer ends 40a of a pair of laterally spaced fulcrum levers 40 which provide the offset gear box (21) embracing inner ends 42. Between the outer companion fulcrum lever portions 40a is the pivot connection 41 which connects fulcrum levers 40 to the outer end of the gear case (21) carried arm 23, as indicated in FIG. 4.

The offset gear box-embracing inner end portions 42 of levers 40 are each longitudinally and transversely slotted (42a) inwardly from the free ends thereof as indicated in FIG. 3. These slots 42a receive opposite ends of the gear-carried pin 43 which project through arcuate slots 45 in the opposite side walls 22a of gear box 21. Thus, after manual raising of the locking sleeve 17 from the FIG. 3 position to the FIG. 4 position, when worm 32 is turned in the proper direction to raise the gear-carrying arm 36 from the FIG. 4 position to the FIG. 3 position, the outer end portions 40a of the fulcrum levers 40 will also be raised. The raising of the outer end portions 40a of levers 40 bodily lifts the bonnet 38 away from the wall-carried sealing beading 12, while the counterclockwise upward rocking of the gear-carried arm 36 cants bonnet 38 upwardly to its operative position.

It will be understood that in the FIG. 3 position, the upwardly canted bonnet 38, being cleared of beading 12, will be freely rotatable about shaft 29 and sleeve 25 as an axis. It will also be clear that such bonnet turning will be controlled by air currents acting in conjunction with the vertical bonnet-carried vane 46.

The bonnet-reinforcing disc 38a is secured at one end to bonnet 38 by the fasteners 39a which attach the pivot or hinge means 39 to disc 38a. The intermediate and opposite end portions of disc 38a are secured to bonnet 38 by the riveted leg end heads 44a and the inwardly spaced shoulders 44b of keeper 44.

Coming now to the form of invention shown in FIGS. 5–9, inclusive, it will be noted that it incorporates the base plate 50 for mounting on the trailer roof, the same having a central hole 51 which is surrounded by the annular flange 52. The collar 53 which surrounds and is carried by the flange 52 corresponds to member 11 of FIGS. 3 and 4 and has fastened to its upper edge the cushion form beading 54.

The bonnet 55 is generally similar to the bonnet 38 shown in FIGS. 3 and 4 in that it is provided with the reinforcing bar 56 which is secured to the under surface of the bonnet 55 by means of end rivets 57, 58 and by a central rivet 59.

However, here as in my aforementioned patent, the bonnet 55 is supported by a leaf spring 60 of substantially J-form so as to provide the elongated leg 60a and the shorter adjacent leg 60b. Spring leg 60a is secured to the bonnet and its reinforcing disc 56 by means of the end rivet 58 as indicated, the upper elongated arm 60a of said spring passing through a loop-form keeper 61 adjacent its depending end 62. This keeper 61 has a wall 61a secured to the bonnet 55 and to its reinforcing disc 56 by means of the intermediate rivet 59 heretofore mentioned.

Figure 7:
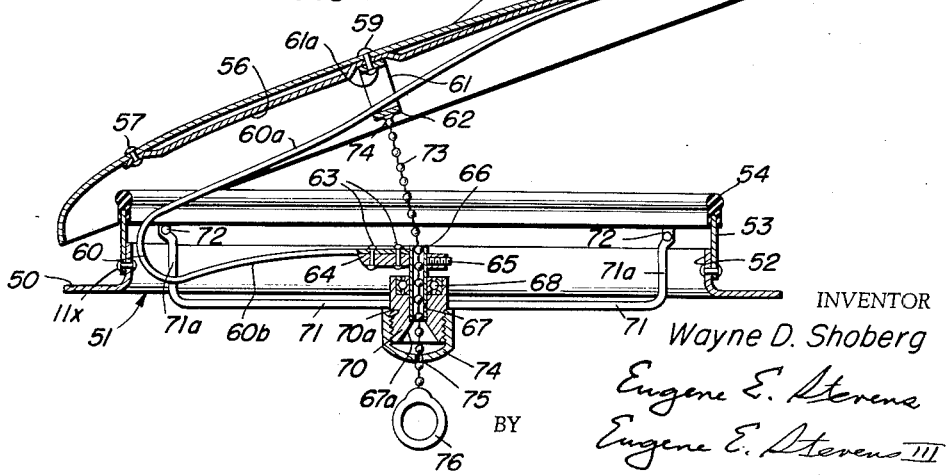
FIG. 7 is a sectional view taken on the line 7—7 of FIG. 5, but showing the bonnet elevated in operative position.

The return bend of the leaf spring 60 lies adjacent a portion of the circular base flange and collar assembly 52, 53, as indicated in FIG. 7. The short arm of the J-form leaf spring 60 is secured, as by rivets 63, to the bar 64 having adjacent one end a transverse vertical hole through which extends the bearing sleeve 66. The set screw 65 locks the bar 64 to the sleeve 66 so that the two will turn as a unit, the sleeve being journalled in a central vertical bore 67 of a preferably cylindrical block member 70 and being supported by a ball bearing assembly 68, which is seated in the top end recess of said cylindrical block 70 as indicated in FIG. 7. The inner ring 68a of the bearing assembly will preferably be fast to the sleeve 66 so as to support the same for rotation in the bore 67.

Coming now to the mounting means for the cylindrical block 70, it will be noted that it is supported by the free long arm ends of a plurality of L-form rods 71 whose short upturned ends 71a provide outwardly offset terminals which are riveted or otherwise secured as at 72 to the collar 53. The free long arm ends of the rods 71 are threaded into the block 70 as indicated in FIG. 7.

The inherent action of the J-spring arms 60a, 60b is to spread so as to raise the bonnet 55 to the operative wind controlled position as indicated in FIG. 7. When it is desired to close the bonnet to the FIG. 6 position against the sealing beading 54, this is accomplished by the flexible pull connection 73 which is secured as at 74 to the portion 62 of the guide 61. The flexible connection 73 passes through the sleeve 66 and out through the widened lower end 67a of the block bore 67 through the V-opening 75 in the screw cap 74. This cap 74 is threaded as at 70a to the lower end of the block member 70.

Figure 6:
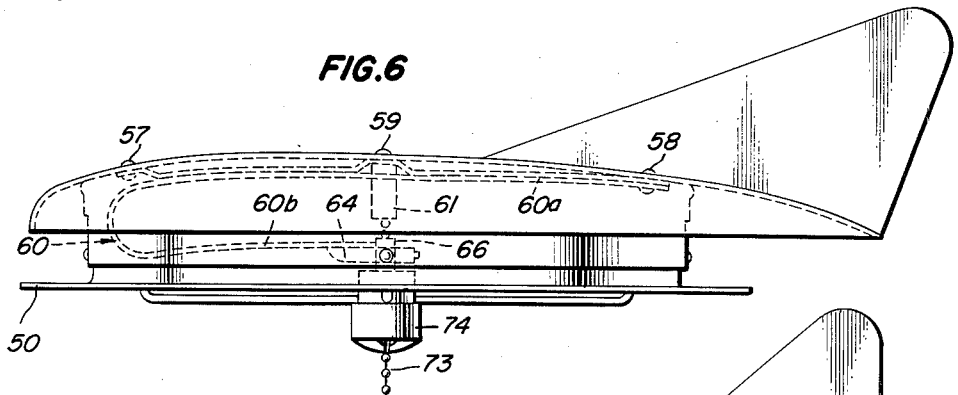
FIG. 6 is a side elevation of the FIG. 5 form of the device with the bonnet in its lowered inoperative position.
Figure 8:
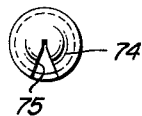
FIG. 8 is a bottom plan view of the chain anchoring cap of FIG. 7.

When it is desired to retain the bonnet 55 in its lowered FIG. 6 position sealed against the beading 54, the pull chain or connection 73 will be moved into the restricted end 75a of the V-slot 75 of the cap member 74, as will be understood from FIG. 8.

Figure 9:
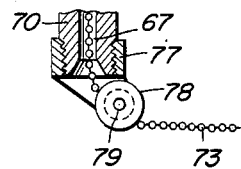
FIG. 9 is a sectional detail of a modification in lieu of the cap of FIG. 8.

In FIG. 9 the cap member 74 is replaced by the fitting 77 carrying the guide roller 78 which is pivoted as at 79 so that the pull chain can be led to some remote point and its terminal ring 76 anchored to a wall-carried hook or the like, not shown.

*Operation Described*

Turning first to the form of invention shown in FIGS. 1–4, inclusive, and let it be assumed that it is desired to raise the bonnet 38 to its operative FIG. 3 position from its lowered and locked FIG. 4 position. First the sleeve 17 is manually lowered relatively of block 13 against the frictional action of the block-carried split ring 20 so as to free the gear case (21) carried stud ends 26 from the sleeve notches or seats 27 so that the gear case 21 and bonnet 38 can rotate about shaft 29 as an axis.

Then the finger piece 30 is operated to turn shaft 29 and its worm 32 in a direction to rock arms 40, 36 to the FIG. 3 position. Arm 36 is actuated by the gear connection 35 with worm 32 and arm 40, 42 by the engagement of gear-carried pin 43 in the slots 42a of arm branches 42. Since there is a self locking engagement of worm 32 with gear 35 the parts will remain in the FIG. 3 positions until manually shifted by reverse operation of finger piece 30.

The operation of the FIGS. 5–9 example of the invention is deemed clear from the drawing. When bonnet 55 is locked down against the action of leaf spring 60 by engagement of chain 73 in the reduced end 75a cap hole 75, it will be sealed against beading 54 and will be retained against turning. However, in the FIG. 6 position spring 60 not only acts to cant bonnet to the operative position, but also bodily elevates the bonnet out of contact with beading 54. This permits the bonnet 55 and sleeve 66 to rotate.

Referring to the telescoping base-supported flanges 10a, 11 of FIGS. 1-4 and the corresponding elements 52, 53 of FIGS. 5-9, it will be understood that said members will yield somewhat so as to admit of 11 (or 53) being canted upwardly slightly with respect to 10a (or 52) and before being fastened to the latter so as to dispose the lowered bonnets (FIGS. 4 and 6) in a horizontal plane in case the supporting roof for base plates 10, 50 slants from the horizontal.

Referring now to the modification shown in FIGS. 10, 11 and 12, the structure is identical with that shown in FIGS. 1-4 except in the following particulars.

First, the bonnet lifting arm 40 of FIGS. 2 and 4 is replaced by an arm 80 having a gear segment 81 at its inner end engaging worm gear 32. Second, the gear box 82 (corresponding to 22 in FIG. 4) is slotted as at 83 to admit of engagement of gear segment 81 with worm gear 32. Third, the upwardly inclined bearing-providing arm 84 of the gear box, to which lift arm 80 is pivoted at 85 is slotted as at 84a to receive lift arm 80. Fourth, keepers 86 are provided fast on bonnet-carried pivot 39 at opposite sides of lift arm 80.

Figure 10:
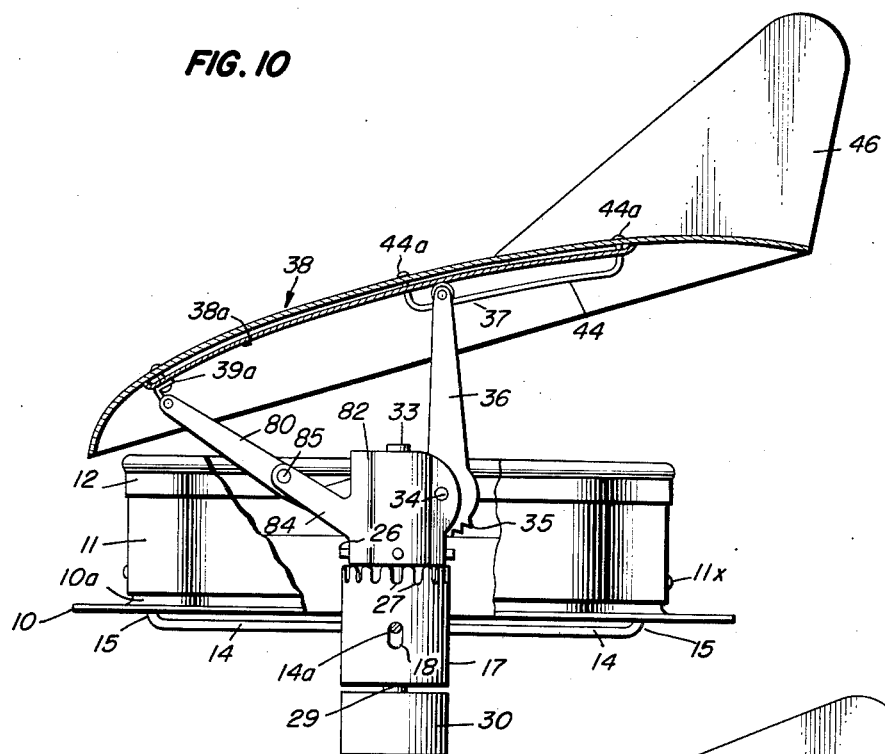
FIG. 10 is a side elevational view, partly broken and partly in section, showing a further modification.
Figure 11:
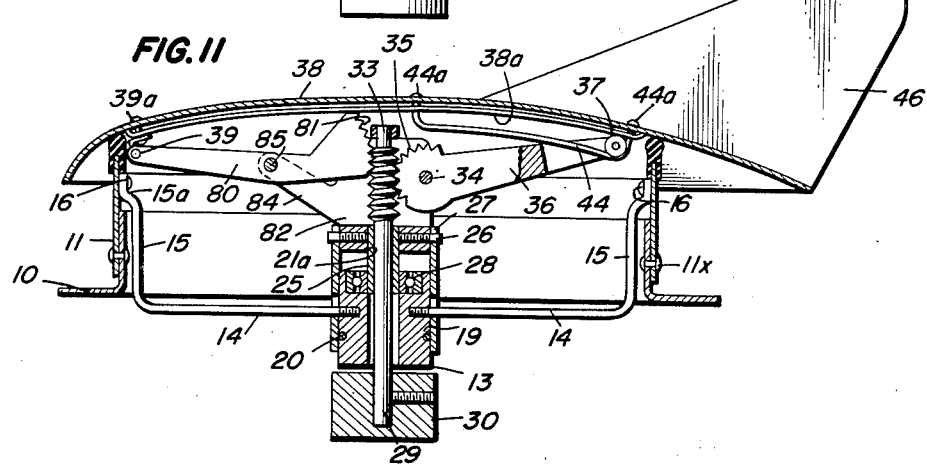
FIG. 11 is a central vertical sectional view of the FIG. 10 device but with the bonnet down.
Figure 12:
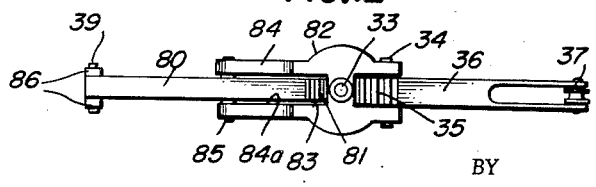
FIG. 12 is a top plan view of the gear box and related arms of the FIG. 10 device.

Thus in the FIGS. 10, 11 and 12 form of invention, worm gear 32 directly controls lift arm 80 as well as the companion arm 36 which means that the twin fulcrum levers 40 and pins 43 of the FIGS. 1-4 form of invention can be eliminated.

As pointed out earlier herein, various changes may be made in the structures illustrated. For instance, reinforcement of the hoods 38 and 55 may be obtained by using other than a disc such as 38a in FIGS. 3 and 10. Also in FIGS. 6 and 7, the equivalent of leaf spring 60 can be used and if used, it need not be of the flat stock type.

Having thus described my invention, what I claim as new and desire to secure by Letters Patent is:

1. In a ventilator providing a rotatable bonnet, comprising a mount having a roof-supported base plate having a hole therethrough for registry with a roof hole, an upstanding plate hole-surrounding flange, a second endless flange, said flanges being in telescoping engagement for the purpose of relative adjustment, means securing said flanges in predetermined adjusted relationships with the top edge of the second flange uppermost, a central bearing-providing member, radially extending supporting arms for said bearing-providing member and having upstanding outer portions providing outwardly offset outer ends anchored to said second flange above the plane of the top of the first flange, whereby to locate said bearing member adjacent the lower portions of said flanges, rotatable bonnet-supporting means in said bearing-providing member, bonnet-raising and lowering means, and aligned guide means for the latter incorporated in each of said bearing-providing member and the rotatable bonnet-supporting means.

2. In a ventilator of the rotatable wind controlled bonnet type, a rotatable gear case, a bearing support therefor, an endless flange spacedly surrounding said bearing support and connected to the latter, a bonnet movable to a seated position on said flange and having a fixed upstanding vane, shiftable means carried by said gear case and operatively connected to said bonnet for moving the latter to and from an upwardly canted operative position away from said flange for directional air current control, gearing in said gear case and operatively connected to said shiftable means for control of the latter, and actuating means for said gearing.

3. The structure of claim 2, said shiftable means comprising two slidably interconnected arms, pivoted at spaced points to said gear case, said gearing comprising a gear fast on one of said arms and a worm gear operatively engaging the latter, and said actuating means connected to said worm gear.

4. The structure of claim 2, said shiftable means comprising two slidably interconnected arms, pivoted at spaced points to said gear case said gearing comprising a gear fast on one of said arms, and a worm gear operatively engaging the latter, and said actuating means comprising an axial and functionally integral shaft extension of said worm gear extending through said bearing support.

5. The structure of claim 2, said shiftable means comprising two slidably interconnected arms, pivoted at spaced points to said gear case said gearing comprising a gear fast on one end of one of said arms as a part thereof, a drive gear for said arm-carried gear and to which drive gear said actuating means is connected, said second mentioned arm having a longitudinal slot therein, and actuating means for said second mentioned arm and comprising a fixed first arm-carried pin slidably engaging in said slot.

6. The structure of claim 2, said shiftable means comprising two slidably interconnected arms, pivoted at spaced points to said gear case said gearing comprising a gear fast on one end of said arms as a part thereof, a worm form drive gear for said arm-carried gear and to which drive gear said actuating means is connected, said second mentioned arm having a longitudinal slot therein, and actuating means for said second mentioned arm and comprising a fixed first arm-carried pin slidably engaging in said slot.

7. The structure of claim 2, and interengageable means in part carried by said gear case and in part carried by said bearing support for retaining said gear case against rotation, and one of said interengageable means being manually shiftable so that it can be engaged and disengaged from the other of said means.

8. The structure of claim 2, and a locking collar carried by said bearing support for manual shifting movement axially of said gear case and having transverse seats in its gear case-adjacent end, and gear case carried lugs engageable in said seats to lock said gear case against rotation.

9. The structure of claim 2, and said shiftable means including oppositely directed gear case-carried arms, one pivoted to the bonnet and the other arm slidably connected thereto.

10. The structure of claim 2, and said shiftable means including oppositely directed gear case-carried arms, one pivoted to the bonnet and one slidably connected thereto, said gearing including a driven worm gear, and the inner end of each of said arms having a gear segment operatively engaged with said worm gear.

11. The structure of claim 2, and a locking collar carried by said bearing support for manual shifting movement axially of said gear case and having transverse seats in its gear case-adjacent end, gear case carried lugs engageable in said seats to lock said gear case against rotation, said locking collar having vertical slots, and said flange and bearing support-connecting means comprising arms extending through said collar slots whereby to prevent relative circumferential shifting of the bearing support and collar while permitting vertical shifting of the latter to and from its lug engaging locking position.

12. In a ventilator providing a rotatable bonnet, comprising a base plate having roof-supported mount, a hole therethrough for registry with a roof hole, an upstanding plate hole-surrounding first flange, a second endless flange outwardly of said first flange, said flanges being in telescoping engagement for the purpose of relative adjustment, means securing said flanges in predetermined adjusted relationships with the top edge of the second flange uppermost, a central bearing-providing member, radially extending supporting arms for said bearing-providing member and having upstanding outer portions providing outwardly offset outer ends, said outer arm ends anchored to said second flange above the plane of the first flange whereby to locate said bearing member adjacent the lower portion of said flanges, and to always dispose the top edge of the second in a plane above the top edge of the first flange, and rotatable bonnet raising and lowering portion-incorporating supporting means in said bearing-providing member.

13. The structure of claim 12, and an endless cushioning beading removably carried by the upper edge of said second flange.

14. The structure of claim 12, and said rotatable bonnet-supporting means comprising a ball-bearing assembly-supported sleeve having a laterally extending arm, a J-form leaf spring as a carrier for said bonnet and providing superposed long and short arms, separate means securing the short spring arm to said sleeve-carried arm and for securing the free end of said long arm to said bonnet, at a point near one edge of the latter and remote from the inner ends of said spring arms.

References Cited in the file of this patent
UNITED STATES PATENTS

| | | |
|---|---|---|
| 1,483,130 | Sylvan | Feb. 12, 1924 |
| 1,831,189 | Obermark | Nov. 10, 1931 |
| 2,211,367 | Davey et al. | Aug. 13, 1940 |
| 2,627,799 | Kurth | Feb. 10, 1953 |
| 2,755,727 | Shoberg | July 24, 1956 |